(12) United States Patent
Kim et al.

(10) Patent No.: US 9,233,610 B2
(45) Date of Patent: Jan. 12, 2016

(54) APPARATUS AND METHOD OF COMPENSATING FOR MOTOR VELOCITY OF FUEL CELL VEHICLE

(71) Applicant: Hyundai Motor Company, Seoul (KR)

(72) Inventors: Kichang Kim, Seoul (KR); Kil Young Youn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 84 days.

(21) Appl. No.: 14/090,552

(22) Filed: Nov. 26, 2013

(65) Prior Publication Data

US 2014/0172210 A1    Jun. 19, 2014

(30) Foreign Application Priority Data

Dec. 14, 2012    (KR) .......................... 10-2012-0146808

(51) Int. Cl.
| | |
|---|---|
| *B60L 11/18* | (2006.01) |
| *B60L 3/00* | (2006.01) |
| *B60L 3/10* | (2006.01) |
| *B60L 11/14* | (2006.01) |
| *B60L 15/20* | (2006.01) |

(52) U.S. Cl.
CPC ............. *B60L 3/0038* (2013.01); *B60L 3/0092* (2013.01); *B60L 3/108* (2013.01); *B60L 11/14* (2013.01); *B60L 15/20* (2013.01); *B60L 2210/40* (2013.01); *B60L 2240/421* (2013.01); *B60L 2240/441* (2013.01); *B60L 2240/461* (2013.01); *B60L 2270/12* (2013.01); *Y02T 10/642* (2013.01); *Y02T 10/70* (2013.01); *Y02T 10/7077* (2013.01); *Y02T 10/7241* (2013.01); *Y02T 10/7275* (2013.01); *Y02T 90/16* (2013.01)

(58) Field of Classification Search
CPC ............ B60K 6/26; B60K 6/365; B60K 6/48; B60K 6/547; B60L 3/0038; B60L 3/108; B60L 11/14; B60L 15/20; B60L 3/0092
USPC ........................... 701/22; 180/65.265, 65.285
See application file for complete search history.

(56) References Cited

U.S. PATENT DOCUMENTS

| | | | |
|---|---|---|---|
| 7,650,956 B2* | 1/2010 | Hirata et al. ................... | 180/248 |
| 2011/0089875 A1* | 4/2011 | Patel et al. ............... | 318/400.09 |
| 2012/0109439 A1* | 5/2012 | Akebono et al. ................. | 701/22 |

FOREIGN PATENT DOCUMENTS

| | | |
|---|---|---|
| JP | 2000-184774 A | 6/2000 |
| KR | 10-2012-0060068 A | 6/2012 |

* cited by examiner

*Primary Examiner* — Nga X Nguyen
(74) *Attorney, Agent, or Firm* — Mintz Levin Cohn Ferris Glovsky and Popeo, P.C.; Peter F. Corless

(57) ABSTRACT

A method and apparatus that compensates for a velocity of a motor of fuel cell vehicle when a resolver is determined to have failed is provided. In particular, a wheel velocity sensor is configured to detect a wheel velocity of a driving wheel, and an ABS controller is configured to calculate an average wheel velocity and transmit the calculated average to a fuel cell controller (FCU). The FCU is configured to receive information related to the wheel velocity upon detecting that the resolver has failed, and control driving of the motor based on the data related to the wheel velocity so that the motor may maintain operation.

8 Claims, 2 Drawing Sheets

APPARATUS AND METHOD OF COMPENSATING FOR MOTOR VELOCITY OF FUEL CELL VEHICLE

CROSS-REFERENCE TO RELATED APPLICATION

This application claims priority to and the benefit of Korean Patent Application No. 10-2012-0146808 filed in the Korean Intellectual Property Office on Dec. 14, 2012, the entire contents of which are incorporated herein by reference.

BACKGROUND (a) Field of the Invention

The present invention relates to a fuel cell vehicle, and more particularly, to an apparatus for compensating for a velocity of a motor of a fuel cell vehicle, which accurately compensates for velocity of a motor even though a failure has been generated in a resolver that typically, detects the velocity of the motor.

(b) Description of the Related Art

According to a continuous demand for improvement vehicle fuel efficiency and stricter regulations regarding the discharge exhaust each country, the demand for an environmentally-friendly vehicle has been increased, and hybrid vehicles and fuel cell vehicles have been become a realistic alternative for the demand.

Fuel cell vehicles are different from hybrid vehicles and electric vehicles in that they an alternative power source as a means to drive an electric motor. This alternative power source is a fuel cell or more particularly a fuel cell stack.

In particular, the fuel cell stack provides an electric current to an electric motor via a generation of electricity within the fuel cell stack from a chemical reaction between a fuel (typically hydrogen) and an oxidant (typically oxygen).

Depending upon the type of fuel cell that is being used the fuel supplied may be for example hydrogen or natural gas. Regardless, fuel cells are made up of three basic components: an anode, an electrolyte, and a cathode. Two chemical reactions occur at the interfaces of each three different components. The net result of the two reactions is that fuel is consumed, water or carbon dioxide is created, and an electric current is created, which can be used to power electric motor of the vehicle.

As a result fuel cell vehicles have no harmful discharge so that pollution is minimized. Accordingly, fuel cell vehicles have a high probability of quickly becoming the leader in the vehicle industry.

However, at this point the fuel cell vehicles includes a large number of components and have a complex system compared to a general internal combustion engine vehicles. Accordingly, a control algorithm for an abnormal operation of each component is typically necessary. For example, however, currently there is no algorithm that effectively and accurately compensates for velocity of a motor even though a failure has been generated in a resolver that typically detects the velocity of the motor The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an apparatus and a method of compensating for failure in an electric motor of a fuel cell vehicle when the failure is generated while transmitting a velocity signal necessary for controlling driving of the motor.

More specifically, in one exemplary embodiment of the present invention provides an apparatus for compensating for a velocity of a motor of a fuel cell vehicle. In particular, a resolver is configured to detect a velocity of the motor during normal operation, and a wheel velocity sensor is configured to detect the wheel velocity of the driving wheel. An ABS controller is then configured to calculate an average wheel velocity based upon data received from the wheel velocity detection sensor and transmit the calculated average velocity to a fuel cell controller. The fuel cell controller is configured to receive information relating to the wheel velocity when a failure within the resolver has been detected, and control driving of (operation of) the motor by calculating the velocity of the motor based on the wheel velocity received from the ABS controller.

The fuel cell controller may calculate the velocity of the motor by applying the calculated average value of the wheel velocity and a final reduction gear ratio provided from the wheel velocity sensor when the failure the resolver has failed. In doing so, the ABS controller may transmit the information (data) relating to the wheel velocity through a controller area network (CAN) communication, and the fuel cell controller may receive the information (data) relating to the wheel velocity through the CAN communication. This transmission may be done for example every 10 ms. Additionally, the ABS controller may transmit the average value of the wheel velocity received from wheel velocity sensors positioned on all four wheels of the vehicle.

In some exemplary embodiments of the present invention, the fuel cell controller may switch to an emergency operation mode when the failure when the resolver is determine to have failed to drive the motor, and may also turn on an emergency indicator (e.g., a light or notification)_ when the fuel cell controller is switched to the emergency operation mode.

Another exemplary embodiment of the present invention provides a method of compensating for velocity of a motor of a fuel cell vehicle, including: monitoring, by a fuel cell controller, a resolver for detecting a velocity of a motor; switching the fuel cell controller to an emergency operation mode when failure of the resolver is determined; receiving data at the fuel cell controller related to the wheel velocity from an ABS controller; and calculating the velocity of the motor from the wheel velocity data received.

The calculating of the velocity of the motor may include calculating the velocity of the motor by applying an average value of the wheel velocity and a final reduction gear ratio provided from the wheel velocity sensor to the calculation. Additionally, the data related to the wheel velocity may be received from the ABS controller via a CAN communication.

According to the exemplary embodiment of the present invention, it is possible to drive a vehicle without stopping the vehicle by switching the fuel cell controller into an emergency operation mode when the velocity of the motor cannot be detected due to a failure within the resolver by configuring the fuel cell controller to receive wheel velocity data from the ABS controller via the CAN communication, and calculating the velocity of the motor based on the received wheel velocity data.

Accordingly, it is possible to increase the stability and reliability of fuel cell vehicles during operation even though failure of the resolver has occurred.

DETAILED DESCRIPTION OF THE EMBODIMENTS

Figure 1:
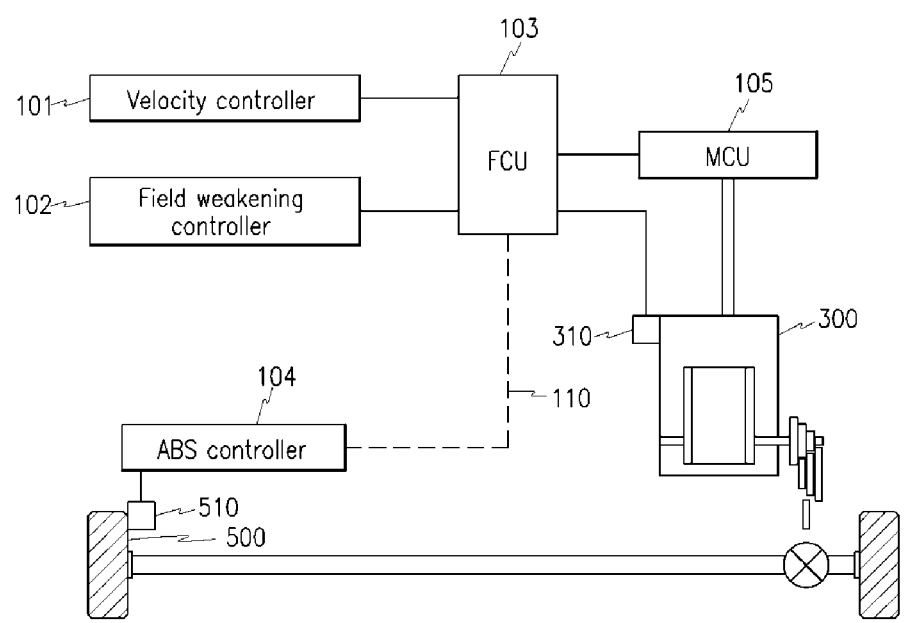
FIG. 1 is a diagram schematically illustrating an apparatus for compensating for velocity of a motor of a fuel cell vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft operated via a fuel cell source.

Additionally, it is understood that the below methods are executed by at least one controller. The term controller or control unit refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Additionally, throughout the specification, unless explicitly described to the contrary, the word "comprise" and variations such as "comprises" or "comprising" will be understood to imply the inclusion of stated elements but not the exclusion of any other elements.

FIG. 1 is a diagram schematically illustrating an apparatus for compensating for velocity of a motor of a fuel cell vehicle according to an exemplary embodiment of the present invention. As can be seen in FIG. 1, the apparatus for compensating for velocity of the motor of the fuel cell vehicle according to the exemplary embodiment of the present invention includes a velocity controller 101, a field weakening controller 102, a fuel cell controller (FCU) 103, a motor control unit (MCU) 105, a motor 300, a resolver 310, driving wheels 500, a wheel velocity sensor 510, and an antilock brake system (ABS) controller 104.

In particular, the velocity controller 101 is configured to detect a shift range selected by a shift lever and provides the FCU 103 with information on the detected shift range. The field weakening controller 102 is provided for the purpose of high-speed driving during driving, and controls a current value according to a control signal applied to decrease magnetic flux of a field magnet of a main motor.

As is apparent from FIG. 1, the FCU 103 is a high level superordinate controller, and integrally controls subordinate controllers connected through a network and collects and analyzes information on the respective subordinate controllers to control an overall behavior of the fuel cell vehicle, e.g., the ABS controller, the MCU, etc. When failure of the resolver 310 is detected, the FCU 103 does not stop the vehicle being operated, but switches to an emergency mode to calculate velocity of the driving motor 300 from data received from the ABS controller 104.

When the failure of the resolver 510 is detected, the FCU 103 calculates the velocity of the motor 300 by employing wheel velocity data, such as an average value of velocity of the driving wheel 500, a final reduction gear ratio provided from the wheel velocity sensor 510, and the diameter of a tire. In this case, the FCU 103 may receive the velocity of the driving wheel 500 from the ABS controller 104, for example, through a controller area network (CAN) communication.

The MCU 105 may include an inverter and a protection circuit formed of a plurality of power switching elements, and may convert a DC voltage supplied from the battery 106 into a three-phase AC voltage to control the operation of the motor 300 according to a control signal applied from the FCU 103. This power switching element included in the MCU 105 may include any one of an insulated gate bipolar transistor (IGBT), a MOSFET, a transistor, and a relay.

Further, the protection circuit included in the MCU 105 may monitor flow of driving power, and distribute or block the driving power when an over voltage and over current is included within the driving power due to various reasons, such as collision or crash of the vehicle, and lighting, thereby protecting the overall system of the fuel cell vehicle and protects passengers in the process.

The motor 300 may be driven with the three-phase AC voltage supplied through the MCU 105 to be operated as a generator. The resolver 310 detects (during normal operation, i.e., when it has not failed) rotation velocity of the motor and provides information related to the detected rotation velocity to the FCU 103 to feedback control the velocity and torque of the motor 300 according to an operational demand and a neighboring environment condition.

In the illustrative embodiment of the present invention, the wheel velocity sensor 510 detects the rotational velocity of the driving wheel 500 according to driving, and transmits information on the detected rotation velocity to the ABS controller 104.

The ABS controller 104 is configured to monitor the wheels on a vehicle and the braking forces that are applied to those wheels so as to prevent the wheel from locking up and provide better overall control of the vehicle. Additionally, in the illustrative embodiment of the present invention, the ABS controller also receives data related to the wheel velocity from the wheel velocity sensors 510 of the four wheels to calculate an average value of each of the wheels, and transmits the information on the calculated average value through the CAN communication 110 to the FCU 103 (e.g., every 10 ms).

Notably, beside the above description, general operation of the fuel cell vehicle according to the present invention including the aforementioned function is identically or similarly executed to that of a fuel cell vehicle in the related art, so that a detailed description thereof will be omitted.

However, in the illustrative embodiment of the present invention the velocity of the motor is calculated in an alternative fashion during a failure of a resolver in order to maintain the stable feedback control when such a failure has occurred, as such only an operation related to this calculation will be described in detail.

Figure 2:
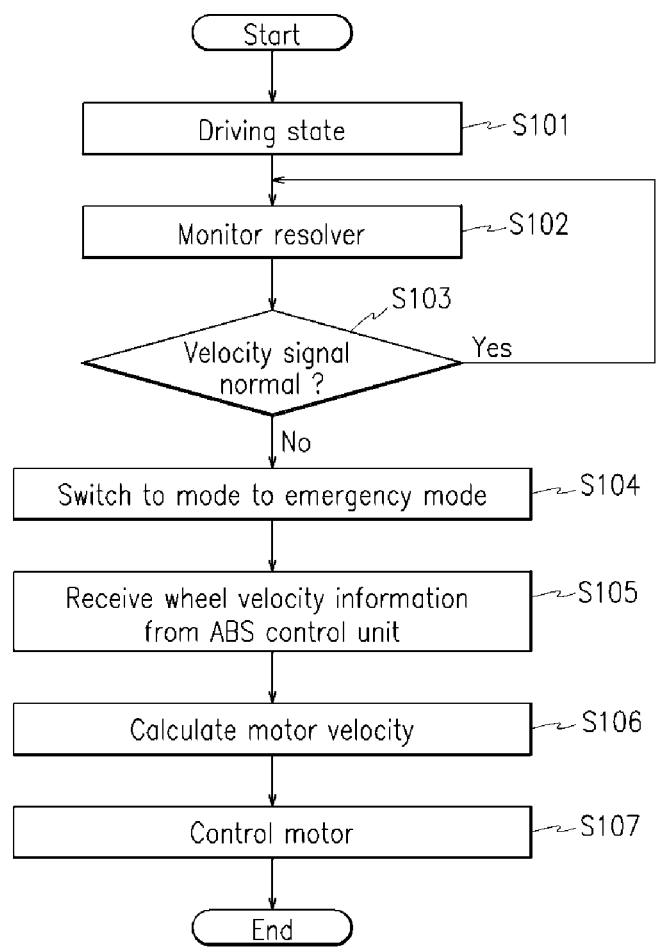
FIG. 2 is a flowchart illustrating a method of compensating for velocity of a motor of a fuel cell vehicle according to an exemplary embodiment of the present invention.

FIG. 2 is a flowchart illustrating a method of compensating for velocity of the motor of the fuel cell vehicle according to an exemplary embodiment of the present invention. In a state where the fuel cell vehicle to which the present invention is applied is operated (S101), the FCU 103 monitors a state of the resolver 310 (S102) to determine whether a failure is detected in the resolver 310 (S103). When a failure of the resolver 310 is not detected in S103, the FCU 103 executes feedback control according to velocity of the motor 300 provided from the resolver 310.

However, when the failure of the resolver 310 is detected S103, the FCU 103 switches to an emergency operation mode (S104). In the emergency operation mode, in some exemplary embodiments of the present invention the FCU 103 may turn on an emergency light, a notification and/or the like. That is, in the above situation, the FCU 103 is no longer receiving velocity information of the motor from the resolver 310, so in its place wheel average velocity information from the ABS controller 104 (S105) is gathered/received.

In this case, the ABS controller 104 periodically receives the wheel velocity information from the wheel velocity sensors 510 of the one or more wheels (e.g., all four wheels) to calculate an average velocity value for those wheels, and transmits the information on the calculated average velocity value via, e.g., a CAN communication 110, so that the FCU 103 may receive wheel average velocity information to execute one or more velocity calculation to control the motor.

Once received at the FCU 103, an average of the wheel velocity of the driving wheels for a predetermined period of time is calculated, and the velocity of the motor 300 is calculated by employing a condition, such as the average wheel velocity value, a final reduction gear ratio determined in a current shift range condition, and a radius of a tire (S106). Based upon this velocity calculation on the FCU 103, the motor 300 is then controlled based on the calculated velocity of the motor 300 (S107).

As descried above, it is possible to improve the stability and reliability fuel cell vehicles by accurately calculating the velocity of the motor 300 when a failure has been detected in the resolver 310 and applying the calculated velocity of the motor 300 to the feedback control.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 101: Velocity controller | 102: Field weakening controller |
| 103: FCU | 104: ABS controller |
| 105: MCU | 110: CAN communication |
| 300: Motor | 310: Resolver |
| 500: Driving wheel | 510: Wheel velocity sensor |

What is claimed is:

1. A system that compensates for a velocity of a motor of fuel cell vehicle during failure of a resolver, comprising:
    A resolver configured to detect the velocity of the motor during normal operation;
    A wheel velocity sensor configured to detect a wheel velocity of a driving wheel attached to the fuel cell vehicle;
    An ABS controller configured to calculate an average wheel velocity and transmit the calculated average wheel velocity; and
    A fuel cell controller configured to detect a failure of the resolver, receive data relating to the wheel velocity when failure of the resolver has been detected, and control driving of the motor by calculating the velocity of the motor based on the data related to the wheel velocity;
    Wherein the ABS controller is configured to transmit the data related to the wheel velocity via a CAN communication every 10 ms;
    Wherein the ABS controller is configured to transmit an average wheel velocity value received from a plurality of wheel velocity sensors at each of four wheels of the vehicle;
    Wherein the fuel cell controller is configured to calculate the velocity of the motor by applying the average wheel velocity and a final reduction gear ratio provided from the wheel velocity sensor when the failure of the resolver is detected.

2. The apparatus of claim 1, wherein:
    the ABS controller transmits the data regarding the wheel velocity via the CAN communication, and the fuel cell controller receives the data related to the wheel velocity through the controller area network (CAN) communication.

3. The apparatus of claim 1, wherein:
    the fuel cell controller switches to an emergency operation mode once the failure of the resolver is detected in order to drive the motor of the fuel cell vehicle.

4. The apparatus of claim 3, wherein:
    the fuel cell controller turns on an emergency indicator when the fuel cell controller is switched to the emergency operation mode.

5. A method of compensating for velocity of a motor of a fuel cell vehicle, comprising:
    Monitoring, by a fuel cell controller, a resolver that detects a velocity of a motor during normal operation;
    Switching, by the fuel cell controller, to an emergency operation mode when the resolver is determined to have failed;
    Receiving, at the fuel cell controller, data relating to a wheel velocity data associated with one or more wheels of the fuel cell vehicle from an ABS controller;
    Calculating, by the fuel cell controller, the velocity of the motor from the wheel velocity data;
    Wherein the data related to the wheel velocity is received from the ABS controller via a CAN communication every 10 ms;

Wherein the fuel cell controller receives an average wheel velocity value from a plurality of wheel velocity sensors at each of four wheels of the vehicle;

Wherein, the calculating of the velocity of the motor includes calculating the velocity of the motor by applying an average wheel velocity value and a final reduction gear ratio provided from the wheel velocity sensor to the motor calculation.

6. The method of claim 5, wherein:

the receiving of the information on the wheel velocity from the ABS controller includes receiving data related to the wheel velocity via the controller area network communication.

7. A non-transitory computer readable medium containing program instructions executed by a controller, the computer readable medium comprising:

Program instructions that monitor a resolver that detects a velocity of a motor during normal operation;

Program instructions that switch a fuel cell controller to an emergency operation mode when the resolver is determined to have failed; and Program instructions that calculate the velocity of the motor from wheel velocity data relating to a wheel velocity associated with one or more wheels of the fuel cell vehicle that is received from an ABS controller via a CAN communication;

Wherein, the calculating of the velocity of the motor includes calculating the velocity of the motor by applying an average wheel velocity value and a final reduction gear ratio provided from the wheel velocity sensor to the motor calculation.

8. The non-transitory computer readable medium of claim 7, further comprises program instructions that turn on an emergency indicator when the fuel cell controller is switched to the emergency operation mode.

* * * * *